Feb. 14, 1939.                E. CHALLET                2,147,090
           ELECTRIC COOKER HAVING A REMOVABLE COMPLEMENTARY UNIT
                        Filed March 29, 1937
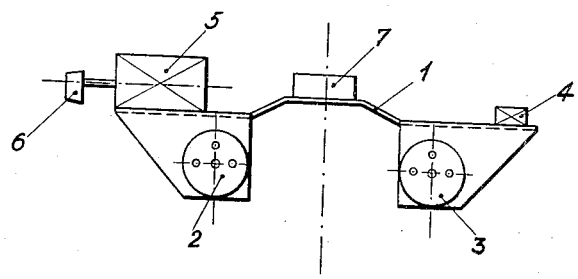
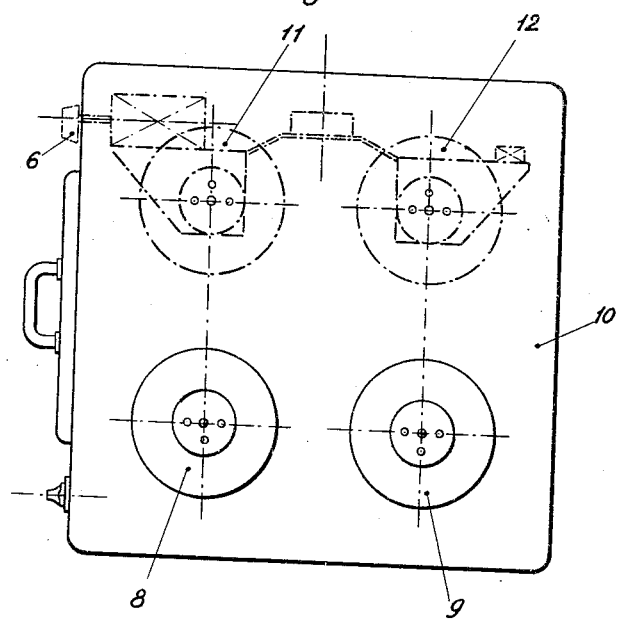
INVENTOR
Etienne Challet
By *[signature]*
ATTORNEY Patented Feb. 14, 1939

2,147,090

UNITED STATES PATENT OFFICE 2,147,090

ELECTRIC COOKER HAVING A REMOVABLE COMPLEMENTARY UNIT

Etienne Challet, Paris, France, assignor to Entreprises Electriques Fribourgeoises, Fribourg, Switzerland, a company of Switzerland Application March 29, 1937, Serial No. 133,715
In Switzerland April 6, 1936

2 Claims. (Cl. 219—37)

The present invention relates to an electric cooker which is provided with a portion which is adapted to be added to the finished article to increase the working capacity of the cooker at will.

It is an object of the present invention to provide an electric cooker with a limited number of heating plates and operative by itself, into which a complementary unit comprising additional heating plates can be readily incorporated.

A further object of the invention is an electric cooker for a family of limited size or limited means, the capacity of which can be increased by a subsequently purchased complementary unit, whenever an improvement of the conditions or an increase in size of the family make such increased working capacity desirable.

Other objects of the invention will readily appear from the specification and drawing. The scope of the invention is deemed to be limited solely by the claims, however.

The principle consists in grouping the connections, switches and plugs for this complementary portion, as a unit which can be easily and quickly mounted on a cooker which is designed at the outset to receive said unit.

The accompanying drawing shows, by way of example, an embodiment of a cooker according to the invention, having room for four heating plates and one oven, but equipped at the outset with only two heating plates and the oven.

Subsequently, if it is desired to fit two other heating plates, it will suffice to plug the unit of Fig. 1 into the frame of the cooker at the outlets provided in the frame. The complementary unit consists of a frame member, take-off plugs for connection with the cooker, a connection box, switches and additional heating units.

Normally, when the cooker is only equipped with two burners, closure plugs are mounted in the holes for the two future plates.

Fig. 1 shows a bottom view of the complementary unit, and

Fig. 2 shows a top view of the cooking top of the primary unit, and (in broken lines) superimposed thereon the complementary unit.

In Figure 1, illustrating the complementary unit, a frame member 1 can be seen supporting the two current take-off plugs 2 and 3 for the new heating plates, (not shown in Fig. 1) the connection box 4, the switch block 5 with the switch knobs such as 6. Optionally, an additional current take-off plug 7 can be provided at the side, which will serve for example for mounting accessory apparatus on the side of the cooker.

Figure 2 shows a cooker having two plates 8 and 9, and the unit of Figure 1 has been shown in broken lines. 10 denotes the outline of the cooking top; 11 and 12 (in broken lines) illustrate the additional heating plates of the superimposed complementary unit.

I claim:

1. In an electric cooker, a primary unit comprising: a cooking top of sufficient size to accommodate a plurality of heating plates, at least one heating plate integrally lodged at a portion of said cooking top, and at least one electric socket at another portion of said cooking top; and a complementary unit comprising: a frame, at least one switch, plug means adapted to engage the said socket, and at least one heating plate; said primary unit being adapted for separate use in the absence of said complementary unit and removably and electrically conductively connectable to said complementary unit by means of said socket and plug means.

2. In an electric cooker, a primary unit and a complementary unit according to claim 1, and on said complementary unit an additional plug for the optional connection of accessory apparatus.

ETIENNE CHALLET.